United States Patent
Howard

(10) Patent No.: US 10,772,128 B2
(45) Date of Patent: Sep. 8, 2020

(54) METHODS, SYSTEMS AND COMPUTER PROGRAM PRODUCTS FOR SLOTTED-ALOHA COLLISION IMPROVEMENT BY POPULATION DENSITY TIMESLOT SELECTION PER RADIO FREQUENCY PROPAGATION PATHLOSS

(71) Applicant: Sensus Spectrum, LLC, Morrisville, NC (US)

(72) Inventor: Gary Aaron Howard, Eagan, MN (US)

(73) Assignee: Sensus Spectrum, LLC, Morrisville, NC (US)

( * ) Notice: Subject to any disclaimer, the term of this patent is extended or adjusted under 35 U.S.C. 154(b) by 24 days.

(21) Appl. No.: 16/161,225

(22) Filed: Oct. 16, 2018

(65) Prior Publication Data

US 2019/0116617 A1      Apr. 18, 2019

Related U.S. Application Data

(60) Provisional application No. 62/572,698, filed on Oct. 16, 2017.

(51) Int. Cl.
*H04W 74/08*     (2009.01)
*H04W 48/16*     (2009.01)
(Continued)

(52) U.S. Cl.
CPC ...... *H04W 74/0816* (2013.01); *H04B 17/318* (2015.01); *H04W 48/16* (2013.01);
(Continued)

(58) Field of Classification Search
CPC . H04W 74/0816; H04W 48/16; H04W 72/02; H04W 72/0446; H04W 74/0841; H04B 17/318
See application file for complete search history.

(56) References Cited

U.S. PATENT DOCUMENTS 5,701,294 A * 12/1997 Ward .................... H04L 1/0003
370/252
6,868,079 B1 * 3/2005 Hunt ................... H04W 74/004
370/328
(Continued)

FOREIGN PATENT DOCUMENTS

EP      1 098 542 A2     5/2011
FR      2 943 884        10/2010

OTHER PUBLICATIONS

International Search Report and Written Opinion, PCT/US2018/056009, dated Jan. 2, 2019, 14 pages.
(Continued)

*Primary Examiner* — Duc C Ho
(74) *Attorney, Agent, or Firm* — Stanek Lemon Crouse & Meeks, PA

(57) ABSTRACT

Methods for determining a transmission timeslot at an endpoint in a communications network are provided. The method includes receiving a message having a received downlink strength at an endpoint; determining an uplink strength for the endpoint based on information in the received message; and allocating a timeslot for uplink transmission from the endpoint based on the determined uplink strength. Related endpoints and computer program products are provided.

20 Claims, 7 Drawing Sheets

(51) Int. Cl.
*H04B 17/318* (2015.01)
*H04W 72/04* (2009.01)
*H04W 72/02* (2009.01)

(52) U.S. Cl.
CPC ....... *H04W 72/02* (2013.01); *H04W 72/0446* (2013.01); *H04W 74/0841* (2013.01)

(56) References Cited

U.S. PATENT DOCUMENTS

| | | | |
|---|---|---|---|
| 7,477,694 B2 | 1/2009 | Sanderford, Jr. et al. | |
| 7,705,777 B2 | 4/2010 | Sanderford, Jr. et al. | |
| 9,060,351 B2* | 6/2015 | Verma ................... | H04W 72/02 |
| 9,112,515 B2 | 8/2015 | Sanderford, Jr. et al. | |
| 9,253,754 B2 | 2/2016 | Sanderford, Jr. | |
| 2004/0131125 A1* | 7/2004 | Sanderford, Jr. ......... | H04L 5/06 |
| | | | 375/261 |
| 2004/0214582 A1* | 10/2004 | Lan ....................... | H04W 72/02 |
| | | | 455/452.2 |
| 2009/0143070 A1 | 6/2009 | Shu et al. | |

OTHER PUBLICATIONS

Notification Concerning Transmittal of International Preliminary Report on Patentability, PCT/US2018/056009, dated Apr. 30, 2020, 8 pages.

* cited by examiner

METHODS, SYSTEMS AND COMPUTER PROGRAM PRODUCTS FOR SLOTTED-ALOHA COLLISION IMPROVEMENT BY POPULATION DENSITY TIMESLOT SELECTION PER RADIO FREQUENCY PROPAGATION PATHLOSS

CLAIM OF PRIORITY

The present application claims priority to U.S. Provisional Application No. 62/572,698 entitled Methods, Systems and Computer Program Products for Slotted-Aloha Collision Improvement by Population Density Timeslot Selection Per Radio Frequency Propagation Pathloss, filed on Oct. 16, 2017, the disclosure of which is hereby incorporated herein by reference as if set forth in its entirety.

FIELD

The present inventive concept relates generally to networks and, more particularly, to communication protocols providing improved collision avoidance.

BACKGROUND

An ALOHA system, or simply ALOHA, is a computer networking system providing a wireless packet data network. In a pure Aloha system, a user can transmit at any time but risks collisions with other users' messages. A modified version of the Aloha system, slotted Aloha, provides a reduced chance of collisions by dividing a communication channel into time slots and generally requiring that a user send only at the beginning of a time slot.

Slotted ALOHA performs better than Pure ALOHA as the probability of collision is less in slotted ALOHA as compared to Pure ALOHA because the base station waits for the next time slot to begin, which lets the frame in a previous time slot pass and avoid the collision between the frames. Slotted ALOHA is a refinement over the pure ALOHA. Slotted ALOHA requires that time be segmented into slots of a fixed length exactly equal to the packet transmission time. A packet arriving to be transmitted at any given base station is delayed until the beginning of the next slot.

As ALOHA presently exists, any strength can be competing with any other strength at the same instant, thus increasing the likelihood of collisions. In other words, ALOHA functions as a survival of the fittest protocol, where the weaker endpoints are adequately exceeded in strength by a competitor so that the stronger endpoint is demodulated and decoded. Demodulation generally requires an adequate carrier to interference ratio over competing radio frequency signals. If all the endpoints' uplink attempts were within each other's carrier to interference ratio requirements, none would succeed. Thus, improved methods of managing communication networks to reduce the likelihood of collisions are needed.

SUMMARY

Figure 1A:
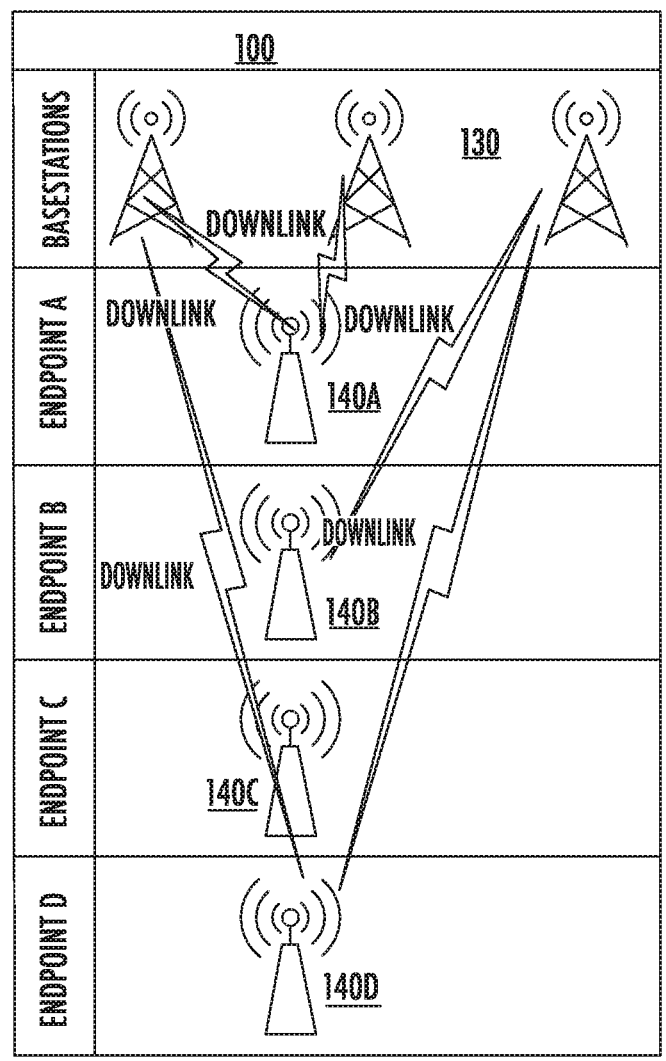
FIG. 1A is a diagram illustrating a communication system including endpoints and base stations in accordance with some embodiments of the present inventive concept.

Some embodiments of the present inventive concept provide methods for determining a transmission timeslot at an endpoint in a communications network. The method includes receiving a message having a received downlink strength at an endpoint; determining an uplink strength for the endpoint based on information in the received message; and allocating a timeslot for uplink transmission from the endpoint based on the determined uplink strength.

In further embodiments, allocating a timeslot may further include determining that the message has a length that is greater than a threshold length for the transmission timeslot; locating a channel having a capacity for the message having the length greater than the threshold length; and communicating the message on the located channel.

In still further embodiments, allocating a timeslot may further include determining that the message has a length that is greater than a threshold length for the transmission timeslot; requesting a pause of aloha messaging responsive to the determination that the message has a length that is greater than the threshold length; and sending the message during the pause.

In some embodiments, determining an uplink strength may include one of receiving an uplink strength in the message received at the endpoint and deriving the uplink strength from the received downlink strength.

In further embodiments, allocating a timeslot for uplink transmission may further include one of locating the determined uplink strength on a lookup table to identify the timeslot for uplink transmission and dividing the determined uplink strength by a number of timeslots to identify the timeslot for uplink transmission.

In still further embodiments of the present inventive concept, the steps of receiving, determining and allocating may be repeated periodically to reassess the timeslot for uplink transmission.

In some embodiments, a spacing between each of a plurality of timeslots may be from about 5 to about 30 dB and a timeslot may have a duration from about 30 seconds to about 1 minute.

Further embodiments of the present inventive concept provide an endpoint in a communications network, the endpoint comprising a processor configured to receive a message having a received downlink strength at the endpoint; determine an uplink strength for the endpoint based on information in the received message; and allocate a timeslot for uplink transmission from the endpoint based on the determined uplink strength.

Still further embodiments of the present inventive concept provide a computer program product for determining a transmission timeslot at an endpoint in a communications network, the computer program product includes a non-transitory computer readable storage medium having computer readable program code embodied in the medium. The computer readable program code includes computer readable program code to receive a message having a received downlink strength at an endpoint; computer readable program code to determine an uplink strength for the endpoint based on information in the received message; and computer readable program code to allocate a timeslot for uplink transmission from the endpoint based on the determined uplink strength.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, as ALOHA presently exists, any strength can be competing with any other strength at the same instant, thus, increasing the likelihood of collisions. In other words, ALOHA functions as a survival of the fittest protocol, where the weaker endpoints are adequately exceeded in strength by a competitor so that the stronger endpoint is demodulated and decoded. Demodulation requires an adequate carrier to interference ratio over competing radio frequency signals. If all the endpoints' uplink attempts were within each other's carrier to interference ratio requirements, none would succeed. Thus, improved methods of managing communication networks to reduce the likelihood of collisions are needed.

In particular, if an uplink attempt requires, for example, 10 decibels (dB) of carrier to interference (C/I) ratio, uplink attempts should be removed for as many of the competing population of endpoints as possible. Thus, according to embodiments of the inventive concept, endpoints use awareness of their relative uplink strength to allow orchestrating for reduction of competition. For example, in the case of a 10 dB C/I ratio requirement, embodiments of the present inventive concept using uplink strength awareness at the endpoint avails approximately 90% of those competing endpoints to be restricted from attempting an uplink during an instant when they would cause a collision as will be discussed further below with respect to FIGS. 1A through 6.

Furthermore, time division multiplexed wired and wireless communications methods include both synchronous and asynchronous architectures. Before architectures could rely upon a global positioning system for a clock as a conductor to disambiguate absolute increments of time, wireless base stations independently conducted the endpoints who heard them best, so coordinating interference in the time-domain may have constricted architectural development. The provision of a global positioning system has enabled cellular and other communications systems to efficiently synchronize base stations to accurately align the timekeeping for endpoint devices. Time segments can then be disambiguated and subdivided into timeslots.

Reservation Aloha and Priority Reservation Aloha are effective when the quantity of endpoints per timeslot is small considering the corresponding airtime requirements. When an Aloha implementation has thousands of endpoints per timeslot, traditional Reservation Aloha methods may not be viable. Accordingly, some embodiments of the present inventive concept provide methods and systems for improving beyond pseudorandom attempts for avoiding unproductive timeslots due to collisions as will be discussed further herein.

Referring first to FIG. 1A, a diagram illustrating a communication system 100 including endpoints and base stations in accordance with some embodiments of the present inventive concept will be discussed. As illustrated in FIG.

1A, the system 100 includes a plurality of base stations 130 and a plurality of endpoints 140A, 140B, 140C and 140D. It will be understood that although three base stations 130 and four endpoints 140A-140D are shown in FIG. 1A, embodiments of the present inventive concept are not limited to this configuration. For example, more or less than three base stations 130 or four endpoints 140A-140D may be included in the system without departing from the inventive concept. Furthermore, as used herein, an "endpoint" refers to any input or output node in a communications system, stimulated by algorithm or learning code perceiving inputs or intent to command, or control, or communicate information. For example, an endpoint in accordance with embodiments discussed herein could be a utility meter or switch or valve, such as water, gas, or electric control or measurement node; a security system, environmental measurement transducer, or a control for an actuator or switch, such as lights or motors or signaling systems.

Figure 1B:
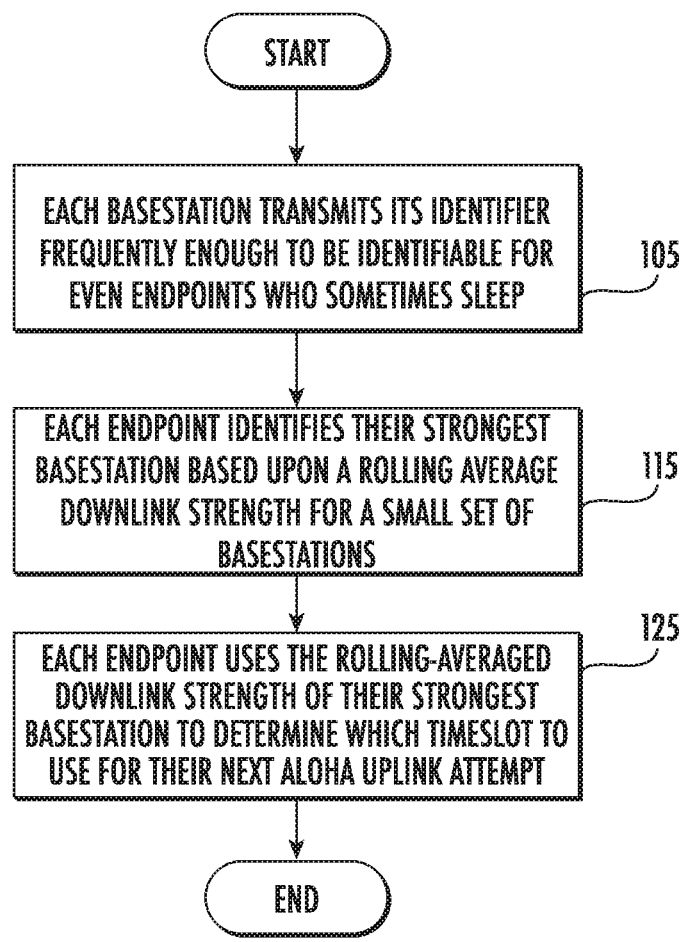
FIG. 1B is a flowchart illustrating operations of the system of FIG. 1A in accordance with some embodiments of the present inventive concept.

Referring now to FIGS. 1A and 1B, operations for measuring downlink strength and endpoint dynamic orchestration into ensembles/cooperating groups for timeslots will be discussed. As discussed herein, endpoint in accordance with embodiments of the present inventive concept use the downlink strengths from the base stations 130 to estimate their own uplink strength. These estimations are then used to orchestrate uplink (Aloha) attempts into dynamic ensembles of endpoints to reduce risks of wasting a timeslot due to collisions. The ensembles are groups of endpoints that work together to reduce the likelihood of collision. These ensembles are dynamic because they are constantly reassessing the timeslot in which they should transmit.

Referring again to FIGS. 1A and 1B, each base station 130 continually transmits (downlink—from base station to endpoints 140A-140D) its identifier frequently enough such that endpoints that are only awake for a short period of time before returning to sleep may receive the identifier (block 105). Thus, the endpoints 140A-140D receive the information from the base station 130 and endpoint identifies the base station 130 transmitting the strongest signal based upon a rolling average downlink strength for a small set of base stations 130 (block 115).

As discussed above, embodiments of the present inventive concept recognize that pathloss for the uplink and downlink are approximately reciprocal, being near the same frequency. This enables a shift in uplink strength to be approximated by knowing the downlink strength. Endpoints 140A-140D have the capability to measure their downlink strength (their received signal level), but do not directly know their uplink strength (received at the base station). However, a relative uplink strength of the endpoint 140A-140D can be inferred from the downlink strength measured/derived at the endpoint 140A-140D. In other words, the downlink and uplink strengths may be roughly the same.

In particular, endpoints 140A-140D can become aware of their uplink strength either by receiving a message from the base station 130 or by deriving it from their own downlink strength. Environmental factors can induce drifts up and down on the order of a few dB, thus, in some embodiments of the present inventive concept the endpoint 140A through 140D recalculate the uplink strength to within a last minute and, therefore, there is no need for updating direction by the base station.

Figure 2:
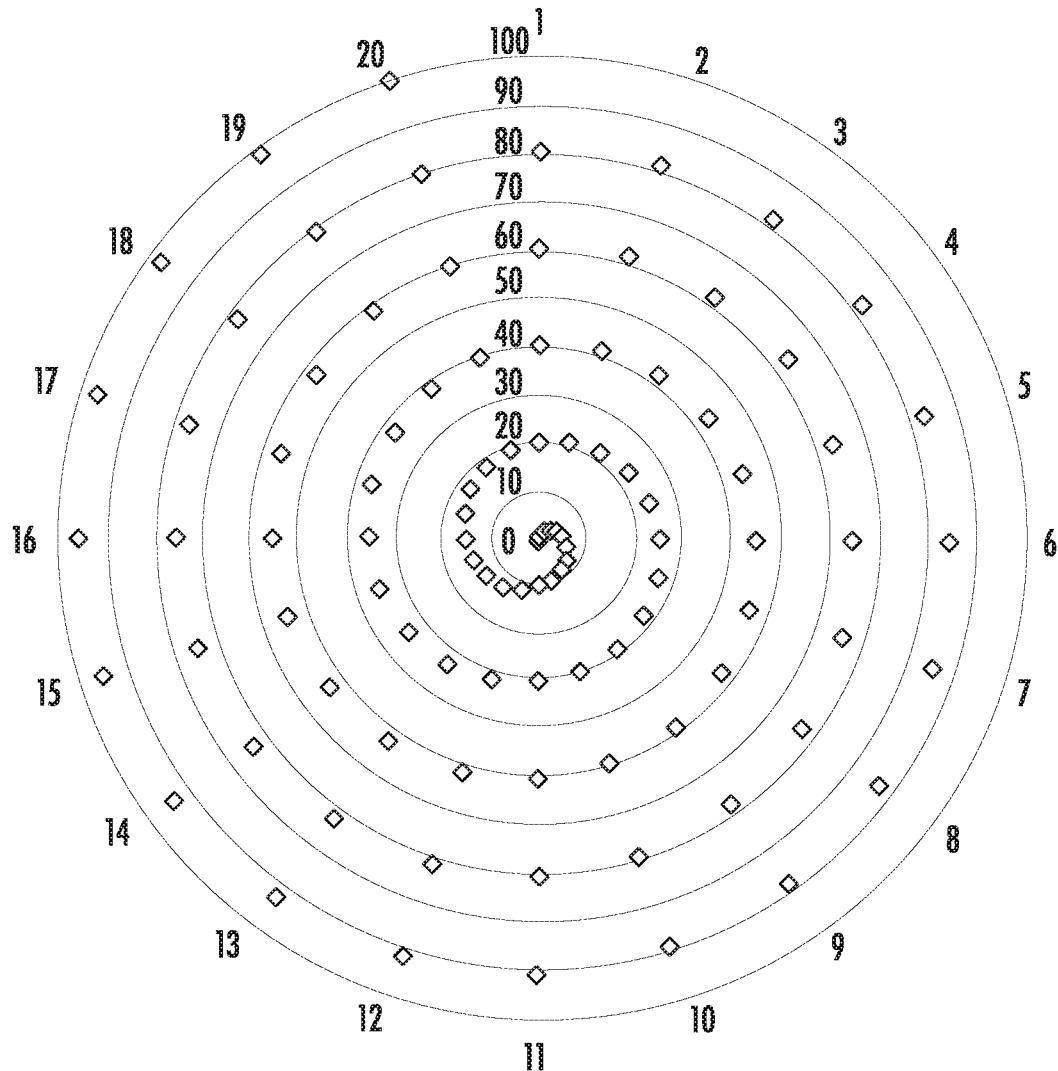
FIG. 2 is a diagram illustrating assignment of timeslots using downlink strength in accordance with some embodiments of the present inventive concept.

Referring now to FIG. 2, a diagram illustrating assignment of timeslots in accordance with some embodiments of the present inventive concept will be discussed. As discussed above, embodiments of the present inventive concept use downlink strengths measured/derived at the endpoint to orchestrate uplink attempts into dynamic ensembles/cooperating groups of endpoints to reduce risks of wasting a timeslot due to collisions. The numbers 0-100 illustrated in FIG. 2 depict the field strength of timeslot spirals. The spacing between the timeslots is, in this example, 20 dB. In particular, going around the spiral clock in FIG. 2, this example illustrates 20 timeslots during which ensembles (groups) of endpoints whose downlink field strengths correspond to the values depicted among the circular gridlines are allowed to attempt an uplink transmission (Aloha uplink).

Each endpoint 140A-140D uses the rolling-averaged downlink strength of the strongest basestation 130 to determine which timeslot to use for their next ALOHA uplink attempt (FIG. 1B—block 125). For example, in some embodiments a lookup table may be used such that the timeslot is selected based on the uplink strength. In further embodiments, a formula may be used to determine the timeslot in which the endpoint should transmit. For example, the uplink strength may be divided by the number of timeslots and the modulus (absolute value) may be used to identify the timeslot in which the endpoint should transmit. In some embodiments of the present inventive concept, the quotient may be rounded to the nearest dB. This method of calculating a timeslot is illustrated below in Eqn. 1:

$$T_{slot} = U_{strength}/N \qquad \text{Eqn. (1)}$$

where $T_{slot}$ is the assigned uplink timeslot; $U_{strength}$ is the uplink strength either derived at the endpoint or provided by the basestation; and N is the number of timeslots available. As discussed above, the quotient provided by Eqn. 1 may then be rounded to a nearest dB to determine the timeslot in which the endpoint should transmit. Eqn. (1) is provided for example only and it will be understood that embodiments of the present inventive concept will not be limited thereto.

Before implementing embodiments of the present inventive concept, an endpoint with any strength ALOHA uplink could attempt to transmit and ultimately interfere with an attempt from a different endpoint. By orchestrating Aloha uplink attempts as illustrated in FIG. 2 in accordance with embodiments discussed herein, collision risk may be reduced, providing an increased likelihood of a successful transmission in that timeslot.

In the example illustrated in FIG. 2, every endpoint may attempt a transmission on the uplink every second. If two endpoints of the same strength have a motivation to communicate within the same second; then they will collide; but reducing the likelihood of such an unproductive timeslot is the orchestration to avoid other endpoints whose uplink attempts would also cause a collision.

The spacing depiction in the diagram of FIG. 2 represents a 20 dB protected carrier to interference ratio (C/I) availed each downlink strength, rounded to the nearest 1.0 dB, however, embodiments of the present inventive concept are not limited thereto. The 20 dB C/I could be reduced or expanded without departing from the scope of the present inventive concept. Furthermore, 50 mS timeslot duration of FIG. 2 could also be reduced or expanded without departing from the scope of the inventive concept. These are all implementation tradeoffs, which could be remotely programmable if dynamic orchestration is needed, or fixed in endpoint code.

A point to multipoint network architecture using Aloha may have limitations in the quantity of Aloha channels available. If there is only one Aloha uplink channel (from the endpoints to the base station or router) then Aloha unproductive transmissions define the latency in the system. This Aloha uplink channel constriction could subject all endpoint-initiated messages to the risks of collisions and unreliable latency. This is especially problematic when data-lengths exceed the timeslot airtime if subdividing the payload among multiple Aloha transmissions.

Reducing unproductive attempts from approximately eighty-two (82) percent to sixty-four (64) percent makes Slotted Aloha more advantageous with the tradeoff of pre-defining message-lengths. For example, if 100 ms airtime is selected, then messages shorter than 100 mS are wasting bandwidth, and messages longer than 100 mS require segmenting the payload data with multiple Aloha messages. Thus, the longer data cannot be reassembled until both segments are transmitted enough to surpass (on average) the sixty-four (64) percent unproductive rate.

For example, in an embodiment most messages fit within a 50 mS airtime, and most remaining messages fit within a 100 mS airtime, then these durations are chosen for the timeslots on two Aloha channels. As will be discussed further below with respect to FIGS. 3 and 4, some embodiments of the present inventive concept provide methods for handling messages that do not fit in one timeslot, i.e. when a message airtime is too long for a timeslotted Aloha channel. In particular, some embodiments of the present inventive concept provide an inhibitory signal Aloha pause method discussed below with respect to FIG. 3, where all endpoints listen to the base station before they speak to ensure that there is no inhibitory message on behalf of another endpoint. Further embodiments of the present inventive concept provide a long-message channel redirection method discussed below with respect to FIG. 4, where if there is another channel available for longer messages, the base station or router redirects the endpoint to that channel for that particular message.

Figure 3:
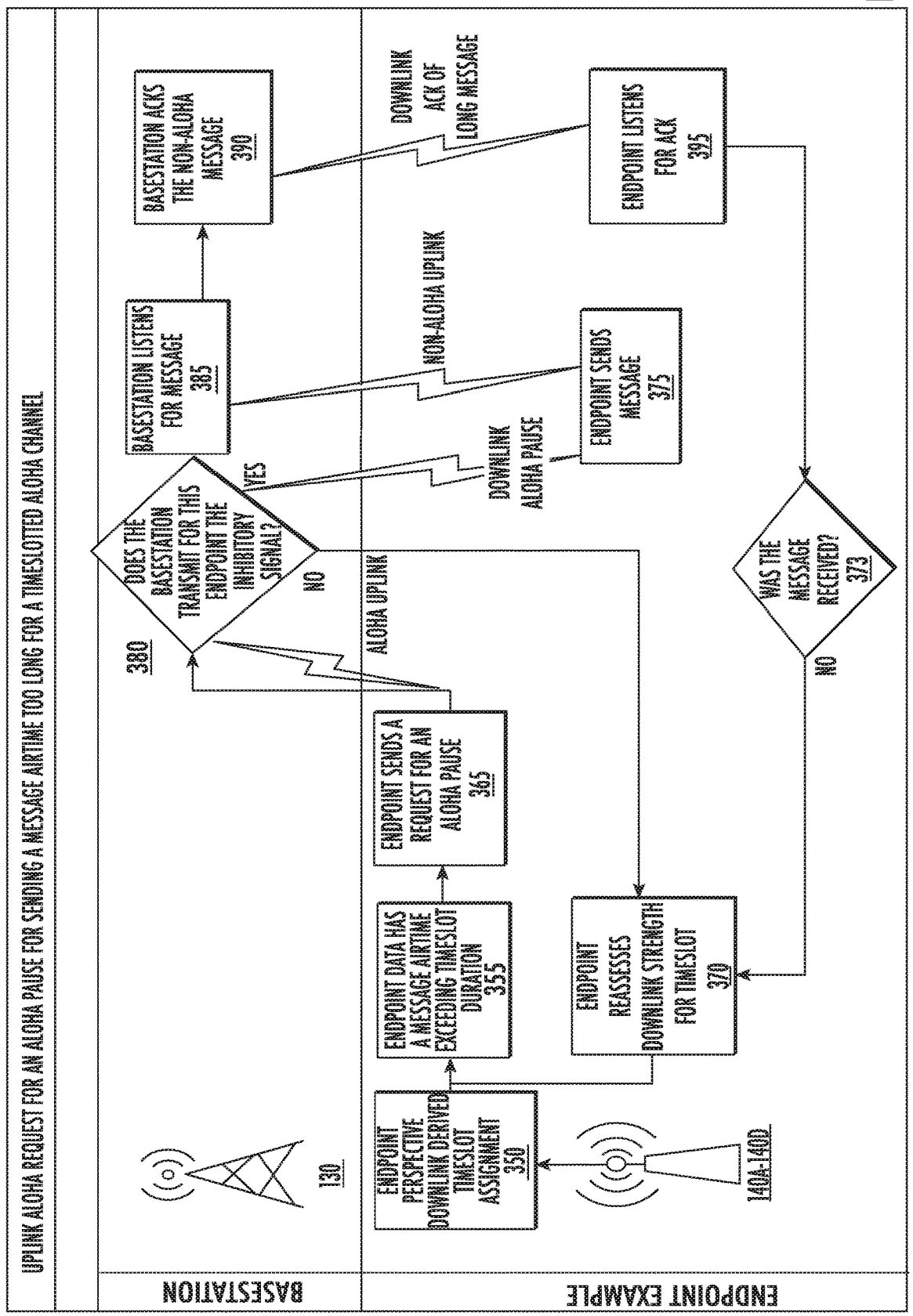
FIG. 3 is a diagram illustrating a system including a base station and endpoint transmitting a message too long for a timeslotted Aloha Channel and requesting an Aloha pause in accordance with some embodiments of the present inventive concept.

Referring now to FIG. 3, methods for implementing an inhibitory Aloha Pause will be discussed. FIG. 3 illustrates a scenario in the system where uplink ALOHA messages greater than a single timeslot in duration are transmitted from the endpoint 140A-140D. As illustrated in FIG. 3, operations begin at the endpoint 140A-140D at block 350 by deriving a timeslot at an endpoint 140A-140D by using the downlink data from the base station 130. As discussed above, the uplink timeslot may be located using a lookup table and the downlink strength from the base station or may be calculated using the downlink strength from the base station. When the message length (message airtime) from the endpoint 140A-140D exceeds a timeslot duration (block 355), the endpoint sends a request for an "Aloha Pause" (block 365) on the Aloha Uplink. It is determined if the base station for this endpoint transmitted an inhibitory signal (block 380). If it is determined that the base station transmitted the inhibitory signal (block 380), a communication via the downlink Aloha pause sends the too long message (block 375). The base station listens on a non-Aloha uplink for the message (block 385) and acknowledges (ACKs) the non-Aloha message (block 390). The endpoint listens for the ACK (block 395) and determines if the message was received (block 373). If it is determined that the message was not received (block 373), the endpoint reassesses the downlink strength for the timeslot (block 370), returns to block 355 and repeats until a message is successfully received.

If it is determined that an inhibitory signal is not received (block 380), the endpoint reassesses the downlink strength for the timeslot (block 370), returns to block 355 and repeats until a message is successfully received.

Thus, in a method using an inhibitory signal aloha pause, an endpoint-initiated message requiring longer airtime than the longest duration timeslot begins with a Request to Send message from that endpoint using the shortest duration timeslot. The requesting endpoint listens to the base station for an Inhibitory Signal that includes the identifier of the one endpoint allowed to transmit. The endpoint identified retunes to the channel longest duration timeslot and transmits the message that was too long for a timeslot. Only the endpoint identified by the Inhibitory Signal is allowed to transmit during this time. The Inhibitory Signal has helped to assure the base station successfully receives the long message.

It will be understood that the is generally a maximum duration of the Inhibitory Signal and methods must be used to avoid contention between base stations calling upon different endpoints within their interference potential. For example, base stations using downlink timeslots (n) are allowed a maximum of 60/n per minute. If n=6 and the assigned downlink timeslot for that base station is 2, Inhibitory signals could be commanded on seconds 2, 8, 14, 20, 26, 32, 38, 44, 50, 56 in every minute.

The Inhibitory Signal enables pausing all Aloha attempts to assure one endpoint successfully transmits their message in one session too long to fit into the timeslots of timeslotted Aloha or standard slotted Aloha. When the second or other system-defined duration of the inhibitory signal ends, the Aloha or Slotted Aloha or Timeslotted Aloha may resume.

Figure 4:
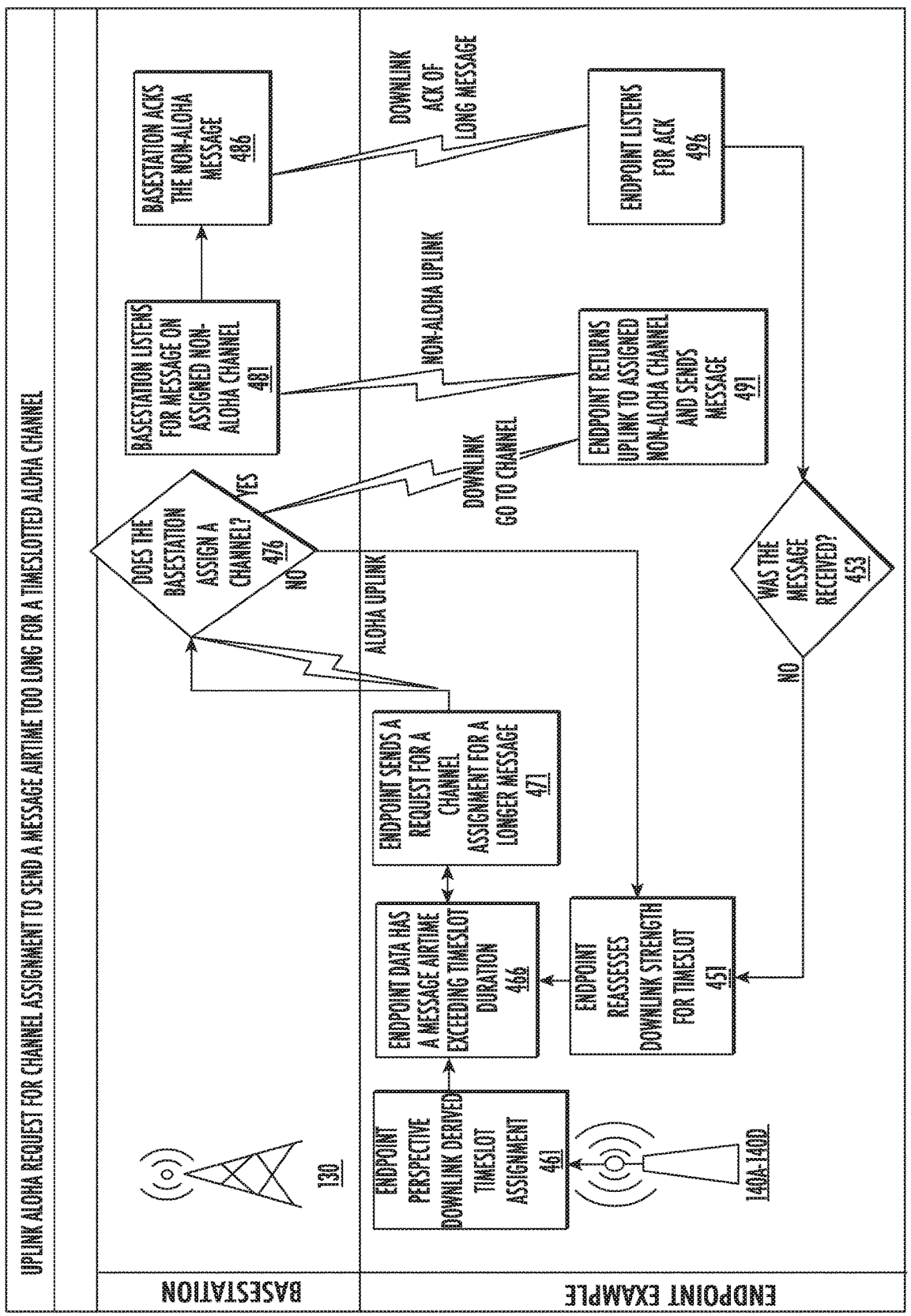
FIG. 4 is a diagram illustrating a system including a base station and endpoint transmitting a message too long for a timeslotted Aloha Channel and redirecting to a channel available for longer messages in accordance with some embodiments of the present inventive concept.

Referring now to FIG. 4, methods implementing long-message channel redirection in accordance with some embodiments of the present inventive concept will be discussed. As illustrated the system of FIG. 4 includes base stations 130 and endpoints 140A-140D in accordance with various embodiments of the present inventive concept will be discussed. In particular, FIG. 4 illustrates a scenario in system 408 including an uplink transmission of a message too long for a timeslot in accordance with various embodiments of the present inventive concept. As illustrated in FIG. 4, operations begin at the endpoint 140A-140D at block 461 by deriving a timeslot at an endpoint 140A-140D by using the downlink data from the base station 130. In the example, of FIG. 4, the message length from the endpoint 140A-140D is greater than an Aloha timeslot (block 466) and the endpoint 140A-140D sends a request for a channel assignment for a message longer than an Aloha timeslot (block 471). It is determined if the base station assigns a channel (block 476). If the base station assigns a channel (block 476), the endpoint retunes the uplink to the assigned non-Aloha channel (block 491) and using a non-ALOHA uplink to the base station, the message is transmitted. The base station listens for the large message on the assigned non-ALOHA channel (block 481). The base station acknowledges the non-ALOHA message (block 486) and the endpoint receives an acknowledgment from the base station for which it is listening (block 496). It is determined if the message is received (block 453). If it is determined that the message was received (block 453), operations cease. However, if it is determined that the message was not received (block 453), operations return to block 451 and repeat until a message is properly received.

If, on the other hand, a channel is not assigned (block 476) operations proceed to block 451 where the endpoint awaits retransmission and reassesses a downlink strength for timeslot selection. Then, operations of blocks 466-476 repeat until the message is successfully received (block 453).

Figure 5:
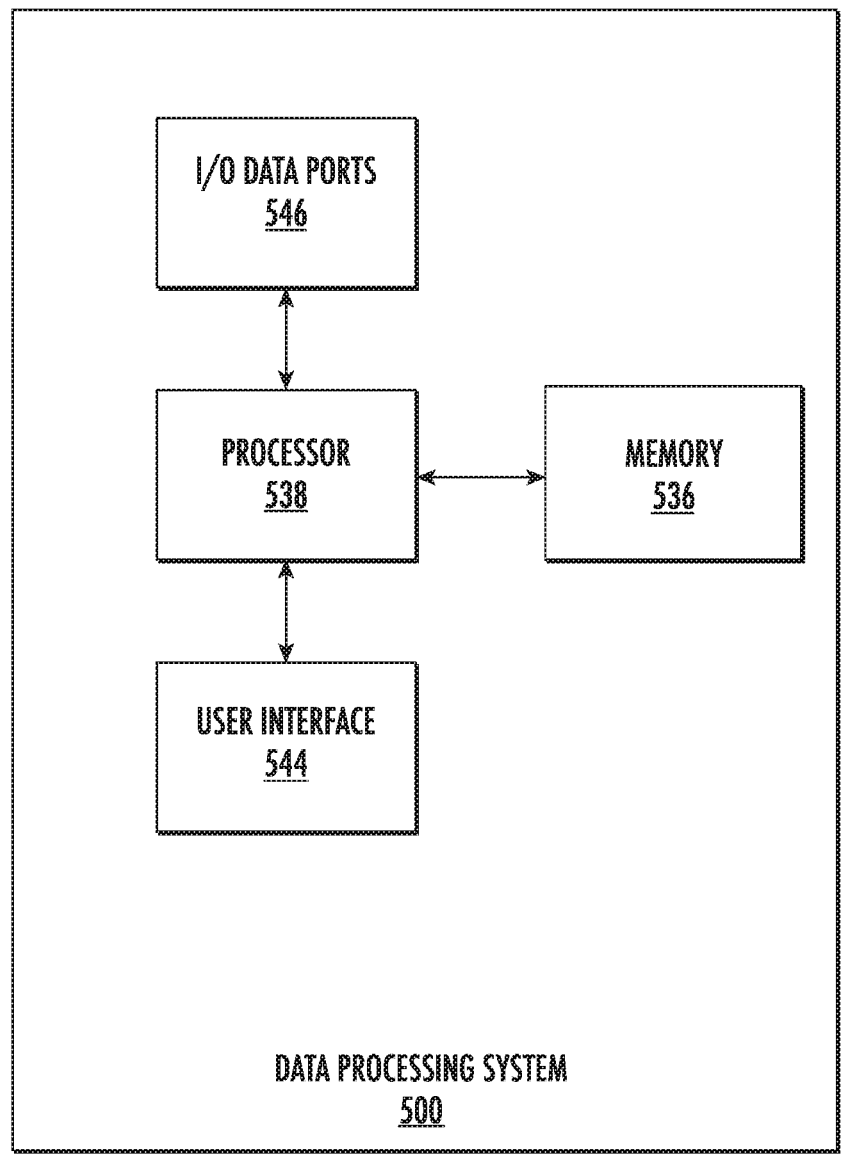
FIG. 5 is a block diagram of a data processing system for use in accordance with some embodiments of the present inventive concept.

Referring now to FIG. 5, an exemplary embodiment of a data processing system 500 suitable for use in accordance with some embodiments of the present inventive concept will be discussed. For example, the data processing system 500 may be provided at the base station, in one of the endpoints or both without departing from the scope of the present inventive concept. As illustrated in FIG. 5, the data processing system 500 includes a user interface 544 such as a display, a keyboard, keypad, touchpad or the like, I/O data ports 546 and a memory 536 that communicates with a processor 538. The I/O data ports 546 can be used to transfer information between the data processing system 500 and another computer system or a network. These components may be conventional components, such as those used in many conventional data processing systems, which may be configured to operate as described herein. This data processing system 500 may be included any type of computing device without departing from the scope of the present inventive concept.

As discussed briefly above, ideally, a separate timeslot would be designated for each endpoint per base station per channel, removing all risk of collision. However, this is impractical. Accordingly, to balance the advantages and disadvantages of all options, embodiments of the present inventive concept assign timeslots to endpoint to reduce the risk of endpoints violating each other's C/I requirement. As discussed above, base stations frequently transmit and eventually all endpoints receive the transmission at a certain downlink strength. Endpoints identify the downlink strength of the strongest base station. This downlink strength is used to determine, at the endpoint, which timeslot the endpoint should use the next time the endpoint transmits on the uplink. Endpoints are constantly reassessing which endpoint they should transmit in before transmitting on the uplink. Accordingly, endpoints will shift around, but the shift is correlated with the downlink strength. Although endpoints hearing the same strength will transmit in the same timeslot, collisions may be significantly reduced using methods of allocating timeslots in accordance with embodiments of the present inventive concept.

Figure 6:
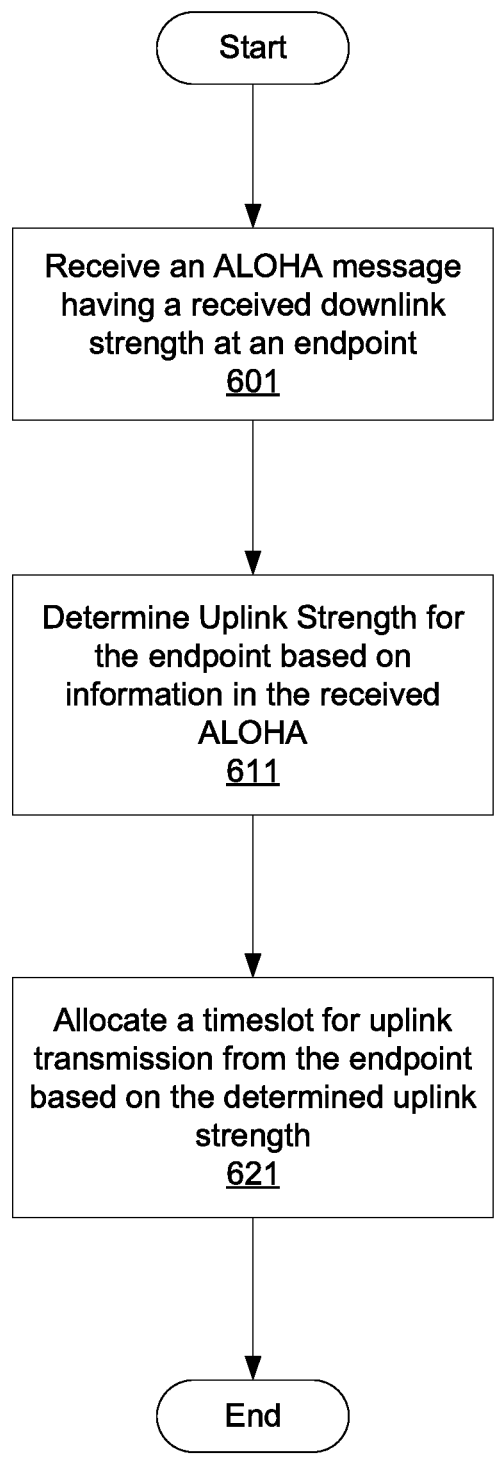
FIG. 6 is a flowchart illustrating operations for determining a transmission timeslot at an endpoint in a communications network implementing a modified slotted ALOHA protocol in accordance with some embodiments of the present inventive concept.

Referring now to FIG. 6, a flowchart illustrating operations in accordance with various embodiments of the present inventive concept will be discussed. As illustrated, operations determining a transmission timeslot at an endpoint in a communications network implementing a modified slotted ALOHA protocol begin at block 601 by receiving an ALOHA message having a received downlink strength at an endpoint. An uplink strength is determined for the endpoint based on information in the received ALOHA message (block 611). A timeslot for uplink transmission is allocated from the endpoint based on the determined uplink strength (block 621).

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the specification, there have been disclosed embodiments of the inventive concept and, although specific terms are used, they are used in a generic and descriptive sense only and not for purposes of limitation. The following claims are provided to ensure that the present application meets all statutory requirements as a priority application in all jurisdictions and shall be construed as setting forth the scope of the present inventive concept.

What is claimed is:

1. A method for determining a transmission timeslot at an endpoint in a communications network implementing a modified slotted ALOHA protocol, the method comprising:
   receiving an ALOHA message having a received downlink strength at an endpoint;
   determining an uplink strength for the endpoint based on information in the received ALOHA message; and
   allocating a timeslot for uplink transmission from the endpoint based on the determined uplink strength,
   wherein the communications network implementing a modified slotted ALOHA protocol includes a plurality of timeslots; and
   wherein a spacing between each of the plurality of timeslots is from about 5 to about 30 dB and wherein each of the plurality of timeslots has a duration from about 30 seconds to about 1 minute.

2. The method of claim 1, wherein allocating a timeslot further comprises:
   determining that the ALOHA message has a length that is greater than a threshold length for the transmission timeslot;
   locating an ALOHA channel having a capacity for the ALOHA message having the length greater than the threshold length; and
   communicating the ALOHA message on the located channel.

3. The method of claim 1, wherein allocating a timeslot further comprises:
   determining that the ALOHA message has a length that is greater than a threshold length for the transmission timeslot;
   requesting a pause of messaging responsive to the determination that the ALOHA message has a length that is greater than the threshold length; and
   sending the ALOHA message during the pause.

4. The method of claim 1, wherein determining an uplink strength comprises one of receiving an uplink strength in the ALOHA message received at the endpoint and deriving the uplink strength from the received downlink strength.

5. The method of claim 1, wherein allocating a timeslot for uplink transmission comprises one of locating the determined uplink strength on a lookup table to identify the timeslot for uplink transmission and dividing the determined uplink strength by a number of timeslots to identify the timeslot for uplink transmission.

6. The method of claim 1, wherein the steps of receiving, determining and allocating are repeated periodically.

7. The method of claim 1, wherein the communications network implementing a modified slotted ALOHA protocol includes a plurality of timeslots and wherein a spacing between each of the plurality of timeslots is from about 5 to about 30 dB and wherein each of the plurality of timeslots has a duration from about 30 seconds to about 1 minute.

8. An endpoint in a communications network implementing a modified slotted ALOHA protocol the endpoint comprising a processor configured to:
   receive an ALOHA message having a received downlink strength at the endpoint;
   self-determine an uplink strength derived by measurement of the downlink strength; and
   allocate a timeslot for uplink transmission from the endpoint based on the self-determined uplink strength,
   wherein the communications network implementing a modified slotted ALOHA protocol includes a plurality of timeslots; and
   wherein a spacing between each of the plurality of timeslots is from about 5 to about 30 dB and wherein each of the plurality of timeslots has a duration from about 30 seconds to about 1 minute.

9. The endpoint of claim 8, wherein the processor is further configured to:
   determine that the ALOHA message has a length that is greater than a threshold length for a transmission timeslot of assigned Aloha channels;
   send a request to a basestation for a redirection to a non-Aloha channel; and
   send the message having the length that is greater than a threshold length on the non-Aloha channel.

10. The endpoint of claim 8, wherein the processor is further configured to:
    determine that the ALOHA message has a length that is greater than a threshold length for a transmission timeslot;
    request a pause of messaging responsive to the determination that the ALOHA message has a length that is greater than the threshold length; and
    send the ALOHA message during the pause.

11. The endpoint of claim 8, wherein the processor is further configured to determine the uplink strength by one of receiving an uplink strength in the message received at the endpoint and deriving the uplink strength from the received downlink strength.

12. The endpoint of claim 8, wherein the processor is further configured to allocate a timeslot for uplink transmission by one of locating the determined uplink strength on a lookup table to identify the timeslot for uplink transmission and dividing the determined uplink strength by a number of timeslots to identify the timeslot for uplink transmission.

13. The endpoint of claim 8, wherein the processor is configured to receive, determine and allocate periodically.

14. The endpoint of claim 8, wherein the communications network implementing a modified slotted ALOHA protocol includes a plurality of timeslots and wherein a spacing between each of the plurality of timeslots is from about 5 to about 30 dB and wherein each of the plurality of timeslots has a duration from about 30 seconds to about 1 minute.

15. The endpoint of claim 8, wherein the endpoint comprises a meter, a switch, a valve, an electric control or measurement node; a security system, an environmental measurement transducer and/or a control for an actuator or switch.

16. A computer program product for determining a transmission timeslot at an endpoint in a communications network implementing a slotted ALOHA protocol, the computer program product comprising:
- a non-transitory computer readable storage medium having computer readable program code embodied in the medium, the computer readable program code comprising:
- computer readable program code to receive an ALOHA message having a received downlink strength at an endpoint;
- computer readable program code to determine an uplink strength for the endpoint based on information in the received message; and
- computer readable program code to allocate a timeslot for uplink transmission from the endpoint based on the determined uplink strength,
- wherein the communications network implementing a modified slotted ALOHA protocol includes a plurality of timeslots; and
- wherein a spacing between each of the plurality of timeslots is from about 5 to about 30 dB and wherein each of the plurality of timeslots has a duration from about 30 seconds to about 1 minute.

17. The computer program product of claim 16 further comprising:
- computer readable program code to determine that the ALOHA message has a length that is greater than a threshold length for the transmission timeslot;
- computer readable program code to locate a channel having a capacity for the message having the length greater than the threshold length; and
- computer readable program code to communicate the message on the located channel.

18. The computer program product of claim 16 further comprising:
- computer readable program code to determine that the ALOHA message has a length that is greater than a threshold length for the transmission timeslot;
- computer readable program code to request a pause of ALOHA messaging responsive to the determination that the ALOHA message has a length that is greater than the threshold length; and
- computer readable program code to send the ALOHA message during the pause.

19. The computer program product of claim 16, wherein the computer readable program code to determine an uplink strength comprises one of computer readable program code to receive an uplink strength in the message received at the endpoint and derive the uplink strength from the received downlink strength.

20. The computer program product of claim 16, wherein the computer readable program code to allocate a timeslot for uplink transmission comprises one of computer readable program code to locate the determined uplink strength on a lookup table to identify the timeslot for uplink transmission and divide the determined uplink strength by a number of timeslots to identify the timeslot for uplink transmission.

* * * * *